United States Patent Office 3,160,601
Patented Dec. 8, 1964

3,160,601
AMINE SALTS OF PHOSPHORIC ACID AND AMINE SALTS OF CARBOXYLIC ACID AS SILANOL CONDENSATION CATALYSTS
James Franklin Hyde, Midland, Mich., assignor to Dow Corning Corporation, Midland, Mich., a corporation of Michigan
No Drawing. Filed July 13, 1959, Ser. No. 826,421
7 Claims. (Cl. 260—46.5)

This invention relates to the use of amine salts as catalysts for the condensation of silicon-bonded hydroxyl groups.

The condensation of silicon-bonded hydroxyl groups employing as catalysts alkali metal and quaternary ammonium hydroxides and organosilicon salts thereof is now well known in the art. However, these catalysts have a primary disadvantage of breaking siloxane bonds causing random rearrangement of siloxane units in a polymer. While this is not a problem where all the siloxane units are alike, it is undesirable where, for instance, there is initially in a polymer a planned distribution of siloxane units containing functional groups. Rearrangement of such siloxane units may well reduce or negate the usefulness of the functional groups. There has been a search by those skilled in the art for a compound which would catalyze the condensation of silicon-bonded hydroxyl groups in a polymer without attacking siloxane bonds and permitting unit rearrangement within the polymer.

The objects of this invention are primarily two-fold. The first object is to provide a new condensation catalyst for silicon-bonded hydroxyl groups. The second object is to provide such a condensation catalyst which is not a siloxane bond rearrangement catalyst. Other objects and advantages of this invention will become apparent as the invention is explained.

This invention relates to the method which comprises condensation of silicon-bonded hydroxyl groups by contacting (A) an organosilicon compound containing at least one silicon-bonded hydroxyl group per molecule, any remaining silicon valences in said organo-silicon compound being satisfied by radicals selected from the group consisting of silicon-bonded oxygen atoms, hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three carbon atoms, with (B) a composition compatible with (A) and selected from the group consisting of (1) a salt of a phosphoric acid, the only active hydrogen atoms in said acid being attached to the phosphorous through an oxygen atom, and a basic amino compound, any active hydrogen in said amino compound being attached to nitrogen, and any remaining valences of the nitrogen atom in said amino compound being satisfied by carbon atoms, the total number of carbon atoms in (1) being at least 18, and (2) a salt of a carboxylic acid, the only active hydrogen atoms in said acid being a part of carboxyl groups, and a basic amino compound, any active hydrogen in said amino compound being attached to nitrogen, and any remaining valences of the nitrogen being satisfied by carbon atoms, the total number of carbon atoms in (2) being at least 6, whereby the silicon-bonded hydroxyl groups in (A) condense to form siloxane linkages producing water as a by-product.

The organosilicon compound can be any silane, siloxane or silcarbane or any mixture thereof in which the only functional groups attached directly to any silicon atom are hydroxyl groups. The silicon valences not satisfied by hydroxyl groups can be satisfied by any groups which do not interfere with the condensation of silicon-bonded hydroxyl groups. Thus the silicon valences can be satisfied by oxygen atoms attached to other silicon atoms to form siloxane linkages, monovalent hydrocarbon radicals, hydrocarbon radicals which are polyvalent, i.e. which have a valence higher than one, each valence of which is attached to another silicon atom to form silcarbane linkages and similar monovalent and polyvalent hydrocarbon radicals containing such functions as ether linkages, aromatic halogen atoms, aliphatic fluorine atoms, hydroxyl groups and nitrile groups. Any aliphatic fluorine atoms should be separated from any silicon atom by at least three carbon atoms.

More specifically, the silicon valences of the organosilicon compound employed in this invention can be satisfied by, for example, any alkyl radical such as the methyl, ethyl, isopropyl, tert-butyl, 2-ethylhexyl, dodecyl, octadecyl and myricyl radicals; any alkenyl radical such as the vinyl, allyl and hexadienyl radicals; any cycloalkyl radical such as the cyclopentyl and cyclohexyl radicals; any cycloalkenyl radical such as the cyclopentenyl and cyclohexenyl radicals; any aryl hydrocarbon radical such as the phenyl, naphthyl and xenyl radicals; any aralkyl radical such as the benzyl, phenylethyl and xylyl radicals and any alkaryl radical such as the tolyl and dimethylphenyl radicals. These monovalent hydrocarbon radicals can also contain aromatic halogen atoms as, for example, in the 2,4,6-trichlorobenzyl, perchlorophenyl, 2-bromonaphthyl, p-iodo-phenylethyl and 4-fluorophenyl radicals; aliphatic fluorine atoms as, for example, in the 3,3,3-trifluoropropyl, α,α,α-trifluorotolyl, 3,3,4,4,5,5,5-heptafluoropentyl and 5,5,5-trifluoro-2-trifluoromethylamyl radicals; hydroxyl radicals as, for example, in the 4-ethyl-4-hydroxyhexyl, 3-hydroxyallyl, cresyl, p-hydroxyphenyl and

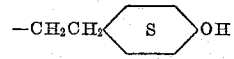

radicals; nitrile radicals as, for example, in the gamma-cyanopropyl and beta-cyanoethyl radicals and ether linkages as, for example, in the $-CH_2CH_2OCH_2CH_3$,

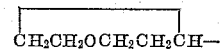

$-CH_2(OCH_2CH_2)_2OCH_3$, $-CH_2OCH_2CH=CH_2$ and furyl radicals. These radicals can contain more than one of the above functions in radicals such as, for example, $-CH_2CH_2CH_2CH_2CHOHCH_2OCH_3$

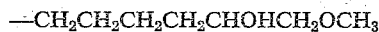

$-CH_2CH_2OCF_2CF_3$

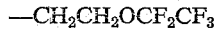

and

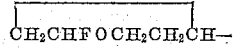

These silicon valences can also be satisfied by polyvalent hydrocarbon radicals attached to other silicon atoms. These polyvalent hydrocarbon radicals can contain singly or in any combination such polyvalent groups as methylene, vinylene, vinylidene, cyclohexylidene, phenylene, tolylene, toluenyl, toluylene, tertiary carbon atoms, and quaternary carbon atoms as well as any monovalent hydrocarbon radicals. These polyvalent hydrocarbon radicals can contain the various functions permissible in the monovalent radicals as previously described. Examples of operative polyvalent hydrocarbon radicals containing such functions include $-CH_2(OCH_2CH_2)_6OCH_2CH_2CH_2-$

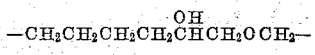

—CH$_2$CH$_2$CHFCH$_2$CH$_2$—, iodophenylene and

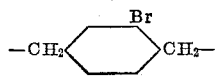

Thus, where R represents any of the abovedescribed monovalent radicals and R' represents any of the abovedescribed polyvalent radicals, the organosilicon compound employed as a starting material can be, for example, any one or any combination of the following types of monomeric compounds or can contain any of the specific types of the following polymer units:

R$_3$SiOH, R$_2$SiOH$_2$, RSi(OH)$_3$, R$_3$SiO$_{.5}$,
R$_2$SiO, RSiO$_{1.5}$, SiO$_2$, R$_2$Si(OH)O$_{.5}$,
RSi(OH)O, R$_3$SiR'Si(OH)$_3$, R$_3$SiR'SiR$_2$OH,
HOR$_2$SiR'SiR(OH)$_2$,

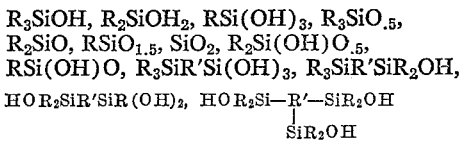

O$_{.5}$R$_2$SiR'SiR$_2$O$_{.5}$ and the like.

In any one molecule of the organosilicon compound there must be at least one silicon-bonded hydroxyl group. While the above list does not include all the possible variations, it is sufficiently representative to show the scope of the materials which can be employed in this invention.

The method of this invention is especially advantageous for producing polysiloxane fluids, gums and resins. Hydroxy-endblocked linear molecules, i.e. diorganopolysiloxanes, can be polymerized without bond rearrangement by the condensation of the terminal silicon-bonded hydroxyl groups. If organosilyl endblocking is desired, the necessary proportion of triorganosilanol or other organosilicon compound containing one silicon-bonded hydroxyl group per molecule can be added to condense with the silicon-bonded hydroxyl on the polymer. If polyfunctionality is desired, the necessary organosilicon compound containing more than two silicon-bonded hydroxyl groups per molecule, e.g. RSi(OH$_3$), $$\begin{matrix} & \text{OH} & \\ \text{HOSiR}_2\text{OSiROSiR}_2\text{OH} & & \end{matrix}$$

or HO(SiR$_2$O)$_5$Si(OH)$_2$O(SiR$_2$O)$_5$H, can be added to condense with the terminal silicon-bonded hydroxyl groups on the polymer. Siloxane resin molecules, i.e. molecules having an average of from 1 to 1.7 organic radicals per silicon atom, which contain silicon-bonded hydroxyl groups can also be cured by the method of this invention.

The crux of this invention resides in the discovery that certain amine salts catalyze the condensation of silicon-bonded hydroxyls under conditions where the amines or the acids alone are inactive. The amine salts are reaction products of basic amino compounds, i.e. ammonia or organic amines (including silylorganic amines), with phosphoric acids or carboxylic acids.

More specifically, the basic amino compound can be ammonia, a primary amine, a secondary amine or a tertiary amine. The amine can contain one or more amino groups and can also contain carbon-bonded silicon atoms and other functional organic groups which are free of active hydrogen. It is necessary that the only active hydrogen atoms, if any, be attached to nitrogen atoms. Any other active hydrogen atoms would interfere with the salt formation. The amino compound can, however, contain various non-interfering functional groups as shown in the following examples.

In short the term "basic amino compound" means compounds containing at least one nitrogen atom attached to no more than three carbon atoms any of which, if double-bonded, are double-bonded only to another carbon atom, e.g.

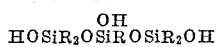

Specific examples of operative amines are: o-aminoacetanilide, iminodiacetonitrile, m-aminoacetophenone, allylamine, N-methylallylamine, amylamine, N,N-dimethylamylamine, aniline, p-bromoaniline, 2,6-dinitroaniline, m-fluoroaniline, sym-bis-gamma-aminopropyl-tetramethyl-disiloxane, gamma(N-aminoethylamino)propyldiphenylmethylsilane, o-iodoaniline, o-nitroaniline, 2,3,4,5-tetrachloroaniline, o-anisidine, 9-anthrylamine, 4,4'-diaminoazobenzene, anthranilonitrile, benzylamine, p-methoxybenzylamine, decylamine, diallylamine, dicyclohexylamine, diethylenetriamine, difurfurylamine, di-m-tolylamine, β-ethoxyethylamine, tetrahydrofurfurylamine, histamine, benzylhydrazine, p-bromophenylhydrazine, 1-methyl-1-phenylhydrazine, 4,4'-diaminohydrazobenzene, p$_3$-leucaniline, methylamine, morpholine, 5-nitronaphthylamine, 1,2 - dimethyl - 4 - pentenylamine, N,N-diethyl-p-phenylenediamine, piperazine, piperidine, 2-aminopyridine, 6-nitro-o-toluidine, 2-amino-p-tolunitrile, 9-phenanthrylamine, and tribenzylamine.

As state above the salts which are operative catalysts in this invention are the reaction products of any of the basic amino compounds described above, i.e. ammonia and primary, secondary and tertiary amines, both organic and silylorganic, with either a phosphoric acid or a carboxylic acid in which any carboxyl group is attached to a carbon atom. As in the basic amino compounds where any active hydrogen atoms are attached to nitrogen atoms, so in the acids any active hydrogen atoms must be a part of the particular acid group, e.g.

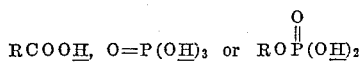

An "active hydrogen" atom is one which forms methane when a compound containing said "active hydrogen" is reacted with methyl magnesium iodide at room temperature.

The salts employed in any particular system must be compatible in that system. The degree of compatibility of any salt in any system generally depends on the total number of carbon atoms and silicon atoms and their configuration in the salt to be employed. Thus, for example, in a given system the n-hexylamine salt of octanoic acid is compatible while the di-n-hexylamine salt of succinic acid is incompatible. However, the di-eicosylamine salt of succinic acid is compatible in that system. Similarly, the mono-2-ethylhexyl amine salt of phenylphosphoric acid is compatible in a given system whereas it is necessary to go to the mono-eicosylamine salt of unsubstituted phosphoric acid to achieve compatibility in the same system. For any particular system suitable salts can be selected on the basis of compatibility.

The most compatible and therefore preferred salts are monocarboxylic acid salts which have at least six carbon atoms. Examples of the monocarboxylic acid which can be used in the preparation of these salts include the following: abietic acid, acetic acid, cyanoacetic acid, phenoxyacetic acid, acrylic acid, β-benzoylacrylic acid, angelic acid, anisic acid, N-acetylanthranilic acid, arachidic acid, atropic acid, benzoic acid, o-bromobenzoic acid, p-cyanobenzoic acid, 2,6-dichlorobenzoic acid, 2,5-dinitrobenzoic acid, m-fluoro-benzoic acid, brassidic acid, dl-campholic acid, capric acid, cinnamic acid, cyclohexanecarboxylic acid, cyclopropanecarboxylic acid, formic acid, 3-furancarboxylic acid, trimethylsilylacetic acid, 5-nitro-2-furoic acid, 10-hendecenoic acid, isobutyric acid, lauric acid, levulinic acid, lignoceric acid, linoleic acid, oleic acid, stearic acid, tetrahydropyromucic acid, 3-ethylpentanoic acid and 2,4-xylic acid.

Polycarboxylic acids while not preferred can also be employed in preparing the amine salt catalyst of this invention. Examples of such acids include: adipic acid, azelaic acid, o-carboxymethoxybenzoic acid, 1-camphoric acid, 1,2-cyclobutanedicarboxylic acid, sym-bis-β-carboxyethyltetramethyldisiloxane, 1,2,3,4,5,6 - cyclohexanehexacarboxylic acid, 1,3-cyclopentanedicarboxylic acid, diphenic acid, ethylmalonic acid, pimelic acid, sebacic acid, succinic acid and traumatic acid. It requires more carbon atoms in an amine salt of a polycarboxylic acid to render it compatible with an organosilicon compound operative in this invention than is the case with an amine salt of a monocarboxylic acid. For instance, in a given system n-hexylamine 2-ethylhexoate is very compatible and active whereas bis-eicosylamine succinate containing over three times as many carbon atoms is still less compatible and therefore less active. This problem can generally be somewhat alleviated by the use of silylorganic amine salts of these acids.

This problem of compatibility also arises with the amine salts of phosphoric acids which are also operative as catalysts in this invention. The salt can be prepared with phosphoric acid or with any acid esters of phosphoric acid such as monovalent hydrocarbon substituted phosphoric acids, e.g. phenylphosphoric, monooctadecylphosphoric or diethylphosphoric acids. An organic amine salt of phosphoric acid must contain at least about 18 carbon atoms to make it sufficiently compatible in a diorganopolysiloxane to be active whereas a silylorganic amine salt may not require so much carbon to render the catalyst compatible depending on the solubility characteristics of the system.

The amine-type salts are prepared by reacting ammonia, an organic amine or an aminoorganosilicon compound with a phosphoric or carboxylic acid. This can be accomplished by merely mixing the components alone in a relatively anhydrous system or by mixing the components together in a common solvent. This preparation is well known.

The amine-type salts can be normal, acidic or basic. The normal salts are those in which there are no unreacted amine or acid groups present as, for example, in

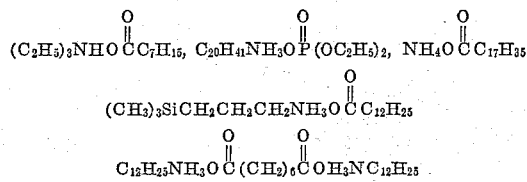

and

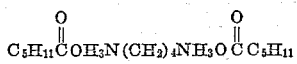

Actually, the normal salts, will often be acidic or basic depending on the relative basic and acidic characters of the amine and acid used to form the salt. This acidity or basicity can be balanced by adding an excess of the necessary amine or acid. The acidic salts are those in which there are unreacted acid groups present as for example, in

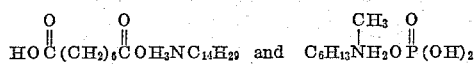

The basic salts are those in which there are unreacted amino groups present as, for example

Further examples of amine salts operative as catalysts in this invention include: di-2-ethylhexylamine acetate, triphenylsilpropylamine formate, trimethylsiloxydimethylsilhexylamine hexoate, 4,4'-diaminobenzophenone butyrate, 4,4'-diamino diphenyl ether decanoate, tri-n-butylamine acrylate, 3,4-dichloroaniline caproate, aniline octanoate, didodecylamine o-chlorophenoxyacetate, ethylamine 3-ethoxypropionate, diethylene triamine monooleate, diisopropylamine palmitate, trimethylamine stearate, benzylhydrazine hexoate, 2,5-dimethylpiperazine octoate, di(octadecylamine) sebacate, ethylenediamine di-hexoate, tetraethylene pentamine di-phosphate, 1,2-aminopropane phenylphosphate and ammonium stearate together with the salts of any other of the amines and acids shown above. These examples are by no means complete, but they do illustrate some of the types of amine-type salts which can be used. These salts can be prepared prior to their inclusion in the condensation system, or they can be prepared in situ. For in situ preparation the order of addition of the acid and amine to the system is not critical.

It should be emphasized that the invention herein does not reside in the amine-type salts, which are generally well-known as a class, but in the use of these salts as catalysts for the condensation of silicon-bonded hydroxyl groups. As catalysts the amount of the amine salts which must be present to condense silicon-bonded hydroxyl groups is not critical since even an infinitesimal amount of such salt will catalyze the reaction to a degree. However, the rate of condensation generally increases with an increase in catalyst concentration. Preferably there should be at least 0.01 percent by weight salt based on the weight of the organosilicon compound to be condensed. An optimum rate of condensation can be achieved in any system with less than 10 percent by weight salt. The best range runs from 0.1 to 5.0 percent by weight of the amine salt. Since the active part of the catalyst is the amine salt group, the percent by weight of catalyst necessary in a given system may increase or decrease with the molecular weight of the amine salt as a whole depending on the effect of the other atoms present on the compatibility of the salt in the system.

It is has been found that any water present in the system slows the rate of SiOH condensation. Consequently, agitation of the system allows water to escape more readily thereby accelerating SiOH condensation.

The temperature and pressure of the system are not critical but affect the rate of condensation. Generally, the rate increases as the temperature increases and the pressure decreases.

The method of this invention is useful for the polymerization of linear polymers in the preparation of rubber-grade gums and for the curing of resins. This method is operative in the presence of organic solvents such as toluene without rearrangement of the siloxane units.

The following examples are illustrative of the method of this invention. These examples are not intended to limit this invention which is properly delineated in the claims. All viscosity measurements were made at 25° C.

EXAMPLE 1

The following amine salts were prepared by mixing together the appropriate amines and acids in the proportions corresponding to the mol ratios of each component in the final salt. Where one component was solid at room temperature as in the case of myristic acid, the mixture was heated until the system was entirely liquid. There was an exothermic reaction in every case.

(A) *Primary Monoamine and Monoacid* n-Hexylamine 2-ethylhexoate
Isobutylamine oleate
t-Butylamine 2-ethylhexoate
t-Butylamine decanoate
t-Butylamine laurate
t-Butylamine myristate
t-Butylamine trimethyl-n-caproate
Cyclohexylamine 2-ethylhexoate
Cyclohexylamine decanoate
Cyclohexylamine laurate
Cyclohexylamine myristate
t-Octylamine 2-ethylhexoate
t-Octylamine decanoate
t-Octylamine laurate
t-Octylamine myristate
t-Octylamine trimethyl-n-caproate
t-Nonylamine 2-ethylhexoate
t-Nonylamine decanoate t-Nonylamine laurate
t-Nonylamine myristate
t-Nonylamine trimethyl-n-caproate
Decylamine 2-ethylhexoate
Decylamine decanoate
Decylamine laurate
Decylamine myristate
Tridecylamine 2-ethylhexoate
Tridecylamine decanoate
Tridecylamine laurate
Tridecylamine myristate
Tridecylamine trimethyl-n-caproate
Eicosylamine 2-ethylhexoate
Eicosylamine decanoate
Eicosylamine laurate
Eicosylamine myristate
Eicosylamine trimethyl-n-caproate
Ammonium oleate
Ammonium stearate
t-Butylamine acetate
t-Butylamine 2,2-dimethylpropanoate
n-Hexylamine formate
n-Hexylamine acetate
n-Hexylamine hexoate
Eicosylamine 2-ethylhexoate
Aniline 2-ethylhexoate (B) *Primary Diamine+Monoacid*

Menthanediamine 2-ethylhexoate (Mono Salt)
Menthanediamine decanoate (Mono Salt)
Menthanediamine laurate (Mono Salt)
Menthanediamine myristate (Mono Salt)

(C) *Mono-Secondary Amine+Monoacid*

Tridecyldodecenylamine [(C$_{13}$H$_{27}$)(C$_{12}$H$_{23}$)NH]-2-ethylhexoate
Tridecyldodecenylamine decanoate
Tridecyldodecenylamine laurate
Tridecyldodecenylamine myristate
Tridecyldodecylamine 2-ethylhexoate
Tridecyldodecylamine decanoate
Tridecyldodecylamine laurate
Tridecyldodecylamine myristate
Diisopropylamine 2-ethylhexoate
Diisopropylamine decanoate
Diisopropylamine laurate
Diisopropylamine myristate
Dibenzylamine 2-ethylhexoate
Dibenzylamine decanoate
Dibenzylamine laurate
Dibenzylamine myristate
Di-n-hexylamine acetate
Di-n-hexylamine 2-ethylhexoate
Di-n-hexylamine formate
Di-n-hexylamine hexoate
Di-n-hexylamine benzoate (D) *Mono-Tertiary Amine+Monoacid*

Triethylamine 2-ethylhexoate
Triethylamine decanoate
Triethylamine laurate
Triethylamine myristate
N,N-dimethyldodecylamine 2-ethylhexoate
N,N-dimethyldodecylamine decanoate
N,N-dimethyldodecylamine laurate
N,N-dimethyldodecylamine myristate
Triisoamylamine 2-ethylhexoate
Triisoamylamine decanoate
Triisoamylamine laurate
Triisoamylamine myristate
Tri-n-hexylamine 2-ethylhexoate (E) *Di-Tertiary Amine+Monoacid*

Tetramethylethylenediamine 2-ethylhexoate (Mono Salt)
Tetramethylethylenediamine decanoate (Mono Salt)
Tetramethylethylenediamine laurate (Mono Salt)
Tetramethylethylenediamine myristate (Mono Salt)
Tetramethylguanidine 2-ethylhexoate (F) *Mono-Primary Amine+Polyacid*

(1) Monohexylamine phosphate
    monoeicosylamine phosphate
(2) Bishexylamine phosphate
    biseicosylamine phosphate
(3) Trishexylamine phosphate
    triseicosylamine phosphate
(4) Bis-eicosylamine succinate

EXAMPLE 2

The polymer employed in this example was initially a hydroxy-endblocked dimethylpolysiloxane having a viscosity at 25° C. of 10,720 c.p.s. (M.W.≅39,000). In each case the catalyst was thoroughly mixed with the polymer in the weight percent shown based on the weight of the polymer and maintained at a given temperature in an open container. Periodically, the mixture was cooled to 25° C. if not already at that temperature and the viscosity was measured after which the mixture was then returned to its reaction temperature.

| Catalyst | Percent by wt. | Temp. (° C.) | Time (hr.) | Visc. (cps.) |
|---|---|---|---|---|
| A mixture of 1 mol of n-hexylamine and 1 mol of n-hexylamine 2-ethylhexoate | 0.92 | 25 | 52 | 16,960 |
| n-Hexylamine 2-ethylhexoate | 1.3 | 25 | 52 | 33,600 |
|  |  |  | 725 | 1,640,000 |
| A mixture of 1 mol of 2-ethylhexoic acid and 1 mol of n-hexylamine 2-ethylhexoate | 2.07 | 25 | 52 | 128,000 |
| A mixture of 2 mols of 2-ethylhexoic acid and 1 mol of n-hexylamine 2-ethylhexoate | 4.35 | 25 | 52 | 201,500 |
| A mixture of 1 mol of n-hexylamine and 1 mol of n-hexylamine 2-ethylhexoate | 0.92 | 110 | 24.5 | 167,000 |
|  |  |  | 47.0 | 672,000 |
|  |  |  | 760 | 44,800,000 |
| n-Hexylamine 2-ethylhexoate | 1.3 | 110 | 24.5 | 103,000 |
| A mixture of 1 mol of 2-ethylhexoic acid and 1 mol of n-hexylamine 2-ethylhexoate | 2.07 | 110 | 24.5 | 131,000 |
| A mixture of 2 mols of 2-ethylhexoic acid and 1 mol of n-hexylamine 2-ethylhexoate | 4.35 | 110 | 24.5 | 137,600 |
| Do | 2.17 | 110 | 25.5 | 168,000 |
| Do | 1.09 | 110 | 25.5 | 216,000 |
| Do | 0.54 | 110 | 20 | 200,000 |
| Do | 0.27 | 110 | 20 | 170,000 |
| Di-n-hexylamine 2-ethylhexoate | 1.74 | 110 | 45 | 685,000 |
|  |  |  | 304 | 28,000,000 |
| Do | 0.44 | 110 | 45 | 1,254,000 |
|  |  |  | 304 | 51,200,000 |
| Do | 0.22 | 110 | 48 | 500,000 |
| n-Hexylamine 2-ethylhexoate | 0.16 | 110 | 48 | 166,500 |
| Tri-n-hexylamine 2-ethylhexoate | 0.28 | 110 | 162 | 55,700 |
| Triisoamylamine 2-ethylhexoate | 0.24 | 110 | 48 | 25,000 |
| Do | 1.96 | 110 | 48 | 410,000 |
| Tetramethylethylene diamine 2-ethylhexoate | .69 | 110 | 48 | 194,000 |

| Catalyst | Percent by wt. | Temp. (° C.) | Time (hr.) | Visc. (cps.) |
|---|---|---|---|---|
| n-Hexylamine 2-ethylhexoate | 0.16 | [1] 50–55 | 20.5 | 95,000 |
| | | | 171.0 | 3,620,000 |
| Do | 0.08 | [1] 50–55 | 72 | 323,000 |
| | | | 143 | 928,000 |
| | | | 240 | 2,600,000 |
| | | | 380 | 4,960,000 |
| Eicosylamine 2-ethylhexoate | 2.33 | [2] 50–70 | 4.0 | 506,000 |
| | | | 16.5 | 10,500,000 |
| Do | 2.33 | 25 | 16 | 2,500,000 |

[1] At <1.0 mm. Hg.
[2] At <0.5 mm. Hg.

EXAMPLE 3

The polymer employed in this example was initially a hydroxy-endblocked dimethylpolysiloxane having a viscosity at 25° C. of 2090 cps. (M.W.≅22,000). Eicosylamine 2-ethylhexoate was mixed with the polymer in an amount equivalent to one nitrogen atom for every two silicon-bonded hydroxyls, i.e. 1.99% by weight based on the weight of polymer. One sample was allowed to stand at room temperature, i.e. 23–25° C. A second sample was heated at 50–52° C. These runs were made for 4 hours at an absolute pressure of 46–54 mm. Hg and the pressure reduced to 8–10 mm. Hg for the remainder of the runs. A third sample was heated at 50–55° C. at an absolute pressure of less than 0.5 mm. Hg. The resulting increases in viscosity were measured by bringing the samples to 25° C. and measuring the viscosity.

TABLE

| Temp. (° C.) | Time (hr.) | Visc. (cps.) |
|---|---|---|
| 23–25 | 48 | 7,680 |
| 50–52 | 48 | 525,00 |
| 50–55 at <0.5 mm. Hg | 7 | 896,000 |
| | 70 | 57,700,000 |

EXAMPLE 4

Three samples of the 10,720 cps. polymer employed in Example 2 were mixed respectively with n-hexylamine 2-ethylhexoate, di-n-hexylamine 2-ethylhexoate and tri-isoamylamine 2-ethylhexoate in an amount equivalent to eight silicon-bonded hydroxyl groups per nitrogen atom. 75 grams of toluene were then added to each mixture, the components were thoroughly mixed, and the resulting mixtures having a viscosity of 430 cps. at 25° C. were heated to and maintained at 75° C. The increase in viscosity was recorded.

TABLE

| Catalyst | Time (hr.) | Visc. (cps.) |
|---|---|---|
| n-Hexylamine 2-ethylhexoate | 116 | 10,72 |
| | 540 | ~40,000,000 |
| Di-n-hexylamine 2-ethylhexoate | 116 | 7,490 |
| Tri-isoamylamine 2-ethylhexoate | 116 | 1,000 |

EXAMPLE 5

A hydroxy-endblocked dimethylpolysiloxane having a viscosity of 46.1 cps. (M.W.≅3000) was mixed with di-n-hexylamine 2-ethylhexoate in an amount equivalent to approximately 25 silicon-bonded hydroxyl groups per nitrogen atom and the mixture was heated to and maintained at 110° C. The viscosity increase was recorded.

TABLE

| Time (hr.): | Visc. (cps.) |
|---|---|
| 21.5 | 10,240 |
| 44.0 | 251,000 |
| 210.0 | ~30,000,000 |

EXAMPLE 6

Samples of the 2090 cps. hydroxy-endblocked dimethylpolysiloxane employed in Example 3 were mixed with the following amine salt catalysts and heated to and maintained at 110° C. Viscosities were measured after 135 hours and 200 hours.

| Catalyst | Percent by weight based on polymer | Time (hr.) | Visc. (cps.) |
|---|---|---|---|
| Menthanediamine mono-2-ethylhexoate | 0.116 | 135 | 1,292,000 |
| | | 200 | 2,560,000 |
| Menthanediamine monomyristate | 0.146 | 135 | 201,000 |
| | | 200 | 710,000 |
| Tetramethyleneguanidine 2-ethylhexoate | 0.108 | 135 | 3,780,000 |
| | | 200 | 8,400,000 |
| Aniline 2-ethylhexoate | 0.109 | 135 | 2,880,000 |
| | | 200 | 4,900,000 |
| Di-n-hexylamine benzoate | 0.109 | 135 | 835,000 |
| | | 200 | 2,460,000 |
| Tetramethylenediamine 2-ethylhexoate | 0.106 | 135 | 4,640 |
| | | 200 | 6,200 |

EXAMPLE 7

Three samples of the 2090 cps. hydroxy-endblocked dimethylpolysiloxane employed in Example 3 were mixed with the following amine phosphate catalysts and heated to 110° C. Viscosities were determined after 112 hours and 200 hours.

| Catalyst | Percent by weight based on polymer | Time (hr.) | Visc. (cps.) |
|---|---|---|---|
| Eicosylamine phosphate | 0.113 | 112 | 1,664,000 |
| | | 200 | 15,000,000 |
| Di-eicosylamine phosphate | 0.109 | 112 | 2,060,000 |
| | | 200 | 8,000,000 |
| Tri-eicosylamine phosphate | 0.110 | 112 | 930,000 |
| | | 200 | 5,500,000 |

EXAMPLE 8

3,3,3-trifluoropropylmethylsilanediol was mixed with 0.2% by weight based on the weight of the silane of n-hexylamine 2-ethylhexoate to give a mixture having a viscosity of 320 cps. After heating for 75 hours at 110° C. the resulting mixture had a viscosity of 1290 cps. After heating for 166 hours at 110° C. the resulting mixture had a viscosity of 5200 cps.

EXAMPLE 9

Hydroxyl-endblocked 3,3,3-trifluoropropylmethylpolysiloxane having a viscosity of 450 cs. was mixed with 2 to 4 percent by weight based on the polysiloxane of isobutylamine oleate. After the mixture was heated for 15 to 20 hours at 150° C., it had a viscosity of between one million and two million cs.

EXAMPLE 10

When 10 parts by weight of a 2000 cs. hydroxyl-endblocked dimethylpolysiloxane and 1 part by weight of $(HO)_3SiO[Si(C_6H_5)(CH_3)O]_2Si(C_6H_5)(CH_3)OH$ added as 40 percent by weight toluene solution are heated at 75° C. for 72 hours in contact with 0.1 part by weight of n-hexylamine 2-ethylhexoate, the resulting mixture gells in 72 hours.

EXAMPLE 11

A 243 cs. hydroxyl-endblocked dimethylpolysiloxane was mixed with approximately one percent by weight of ammonium oleate prepared by mixing stoichiometric amounts of ammonia and oleic acid. This mixture was heated for 40 hours at 110° C. after which the viscosity of the mixture had risen to 1,000,000 cs.

EXAMPLE 12

A 2000 cs. hydroxyl-endblocked dimethylpolysiloxane was mixed 0.1% by weight of bis-eicosylamine succinate and heated for 24 hours at 110° C. The resulting viscosity of the mixture was 6700 cs.

EXAMPLE 13

The resin employed herein was a copolymer of 45 mol percent monomethylsiloxane units, 40 mol percent monophenylsiloxane units, 5 mol percent phenylmethylsiloxane units and 10 mol percent diphenylsiloxane units and contained approximately two percent by weight silicon-bonded hydroxyl groups. Between 0.1 and 0.2 percent by weight di-n-hexylamine acetate was mixed in the resin solution and the solvent was stripped off. The resin mixture was then press-molded at 1000 p.s.i. for ½ hour at 175° C., cooled and baked for 16 hours at 90° C. followed by heating with an increase in temperature of 16° C. per hour until the temperature reached 250° C. The resin mixture was subsequently heated for from 4 to 12 hours at 250° C. When this resin was treated as stated, it was found to have cured to a hard resinous solid.

When this experiment is done employing di-n-hexylamine formate instead of di-n-hexylamine acetate, the results are approximately the same.

When this experiment is done with n-hexylamine formate, n-hexylamine acetate, t-butylamine acetate or t-butylamine 2,2-dimethylpropanoate instead of di-n-hexylamine acetate, a cured resin is produced.

EXAMPLE 14

When the experiment of Example 5 is repeated employing the following amine salt catalysts instead of di-n-hexylamine 2-ethylhexoate, similar results are obtained through the condensation of silicon-bonded hydroxyl groups:

$(C_6H_5)_2(CH_3)SiOSi(C_6H_5)_2CH_2CH_2CH_2NH_3O\overset{O}{\overset{\|}{C}}C_5H_{11}$ $(CH_3)_3SiCH_2CH_2CH_2NHCH_2CH_2NH_3O\overset{O}{\overset{\|}{C}}C_7H_{15}$ $(CH_3)(C_2H_5)(C_6H_5)Si(CH_2)_3\underset{\underset{CH_2CH_2NH_3O\overset{O}{\overset{\|}{C}}C_7H_{15}}{|}}{NH_2}O\overset{}{\overset{\|}{C}}C_7H_{15}$ and each of the amine salts of Example 1 with the exception of t-butylamine acetate, t-butylamine 2,2-dimethylpropanoate, n-hexylamine formate and n-hexylamine acetate shown in Example 13.

EXAMPLE 15

When 2000 cs. hydroxyl-endblocked phenylmethylpolysiloxane was heated at 110° C. with approximately 2 percent by weight n-hexylamine 2-ethylhexoate until the viscosity of the mixture had risen to 50,000 cs. and an excess of phenylmethylvinylsilanol was added to the mixture, further heating of the mixture produced a product composed of sym - diphenyldimethyldivinyldisiloxane which could be stripped off leaving approximately 50,000 cs. phenylmethylvinylsiloxy-endblocked phenylmethylpolysiloxane.

EXAMPLE 16

When the following hydroxyl-endblocked organosilicon compounds are each heated at 110° C. in the presence of approximately 2 percent by weight of n-hexylamine 2-ethylhexoate based on the weight of the organosilicon compound, condensation of the silicon-bonded hydroxyl groups to form SiOSi linkages will take place as shown by the gradual increase in viscosity in each system proving an increase in molecular weight.

$HOSi(CH_3)(C_2H_3)O[Si(CH_3)_2O]_{80}[Si(CH_3)(CH_2CH_2CN)O]Si(CH_3)(C_2H_3)OH$ $HOSi(CH_3)_2CH_2\underset{}{\overset{Br}{\bigcirc}}CH_2Si(CH_3)_2OSi(CH_3)_2OH$ $HOSi(C_6H_5)\underset{\underset{CH_3}{|}}{\overset{\overset{CH_3}{|}}{}}CH_2CH_2CH_2CH_2\overset{\overset{OH}{|}}{CH}CH_2OCH_2Si(CH_3)_2OH$ $HOSi(CH_3)\underset{\bigcirc}{}O[Si(CH_3)_2-CH=CH-Si(CH_3)_2O]_2Si(CH_3)_2OH$ A copolymer of:
50 mol percent dimethylsiloxane units
45 mol percent phenylmethylsiloxane units
3 mol percent perchlorophenylmethylsiloxane units
1 mol percent cyclohexylbenzylsiloxane units
1 mol percent dicresylsiloxane units.

That which is claimed is:

1. The method for the condensation of silicon-bonded hydroxyl groups which comprises contacting (A) an organosilicon compound containing at least one silicon-bonded hydroxyl group per molecule, the remaining silicon valences in said organo-silicon compound being satisfied by radicals selected from the group consisting of silicon-bonded oxygen atoms attached to other silicon atoms to form siloxane linkage, hydrocarbon radicals and hydrocarbon radicals containing functions selected from the group consisting of ether linkages, aromatic halogen atoms, nitrile groups, hydroxyl groups and aliphatic fluorine atoms, the last being separated from any silicon atom by at least three carbon atoms, with from 0.01 to 10 percent by weight based on the weight of (A) of (B) a composition compatible with (A) and selected from the group consisting of (1) a salt of a phosphoric acid, the only active hydrogen atoms in said acid being attached to the phosphorus through an oxygen atom, and a compound selected from the group consisting of ammonia and amines, any active hydrogen in said compound being attached to nitrogen and any remaining nitrogen valences being satisfied by carbon atoms, the total number of carbon atoms in (1) being at least 18 and (2) a salt of a carboxylic acid, the only active hydrogen in said carboxylic acid being a part of carboxyl groups, and a compound selected from the group consisting of ammonia and amines, any active hydrogen in said compound being attached to nitrogen and any remaining nitrogen valences being satisfied by carbon atoms, the total number of carbon atoms in (2) being at least 6, whereby the silicon-bonded hydroxyl groups in (A) condense to form siloxane linkages producing water as a by-product.

2. A heat-curable composition consisting essentially of a mixture of (A) an organopolysiloxane containing an average of from 1.0 to 1.7 monovalent hydrocarbon radicals per silicon atom and an average of greater than two silicon-bonded hydroxyl groups per molecule, and from 0.01 to 10 percent by weigh tbased on the weight of (A) of (B) a salt of (1) a carboxylic acid, the only active hydrogen in said acid being a part of carboxyl groups, and (2) an amine, any active hydrogen in said amine being attached to nitrogen, any remaining nitrogen valences being satisfied by carbon atoms, the total number of carbon atoms in (B) being at least 6.

3. The method which comprises contacting a polysiloxane containing an average of from 1 to 3 monovalent hydrocarbon radicals per silicon atom and at least one silicon-bonded hydroxyl group per molecule with from 0.1 to 5.0 percent by weight based on the weight of the polysiloxane of a compatible salt of an aliphatic hydrocarbon monocarboxylic acid and an amine composed of carbon atoms, hydrogen atoms and nitrogen atoms, there being a total of at least 6 carbon atoms in said salt, whereby the silicon-bonded hydroxyl groups condense to form siloxane linkages producing water as a by-product.

4. The method of claim 3 in which the amine salt contains at least 10 carbon atoms.

5. The method of claim 4 in which the polysiloxane is essentially a diorganopolysiloxane.

6. The method which comprises contacting a polysiloxane containing an average of from 1 to 3 monovalent hydrocarbon radicals per silicon atom and at least one silicon-bonded hydroxyl group per molecule with from 0.1 to 5.0 percent by weight based on the weight of the polysiloxane of a compatible salt of an aliphatic hydrocarbon monocarboxylic acid and an amine composed of carbon atoms, hydrogen atoms, nitrogen atoms and silicon atoms attached only to carbon atoms, there being a total of at least six carbon atoms in said salt, whereby the silicon-bonded hydroxyl groups condense to form siloxane linkages producing water as a by-product.

7. A heat curable composition consisting essentially of a mixture of
(A) an organopolysiloxane containing an average of from 1.0 to 1.7 monovalent hydrocarbon radicals per silicon atom and an average of greater than two silicon-bonded hydroxyl groups per molecule, and from 0.1 to 10 percent by weight based on the weight of (A) of (B) a salt of
  (1) a phosphoric acid, the only active hydrogen atoms in said acid being attached to the phosphorus through an oxygen atom, and
  (2) an amine, any active hydrogen in said amine being attached to nitrogen, any remaining nitrogen valences being satisfied by carbon atoms, the total number of carbon atoms in
(B) being at least 18.

References Cited in the file of this patent
UNITED STATES PATENTS

| | | |
|---|---|---|
| 2,830,967 | Nitzsche et al. | Apr. 15, 1958 |
| 2,830,968 | Clark | Apr. 15, 1958 |
| 2,902,468 | Fianu | Sept. 1, 1959 |

UNITED STATES PATENT OFFICE
CERTIFICATE OF CORRECTION

Patent No. 3,160,601                                  December 8, 1964

James Franklin Hyde

It is hereby certified that error appears in the above numbered patent requiring correction and that the said Letters Patent should read as corrected below.

Column 9, EXAMPLE 3, in the TABLE, under the heading "Visc. (cps.)", line 2 thereof, for "525,00" read -- 525,000 --; column 10, EXAMPLE 4, in the TABLE, under the heading "Visc. (cps.)", line 1 thereof, for "10,72" read -- 10,720 --; column 12, lines 4 to 7, the formula should appear as shown below instead of as in the patent:

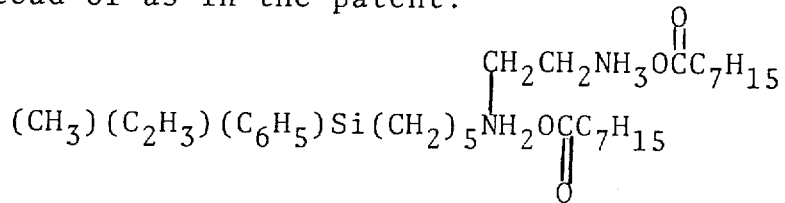

column 14, line 22, for "0.1" read -- 0.01 --.

Signed and sealed this 29th day of June 1965.

(SEAL)
Attest:

ERNEST W. SWIDER                        EDWARD J. BRENNER
Attesting Officer                      Commissioner of Patents